Dec. 11, 1945. W. A. MILLER ET AL 2,390,608
FREQUENCY MULTIPLIER
Filed Oct. 5, 1943 3 Sheets-Sheet 1

INVENTORS
WILLIAM A. MILLER
EUGENE R. SHENK
BY
H. S. Grover
ATTORNEY

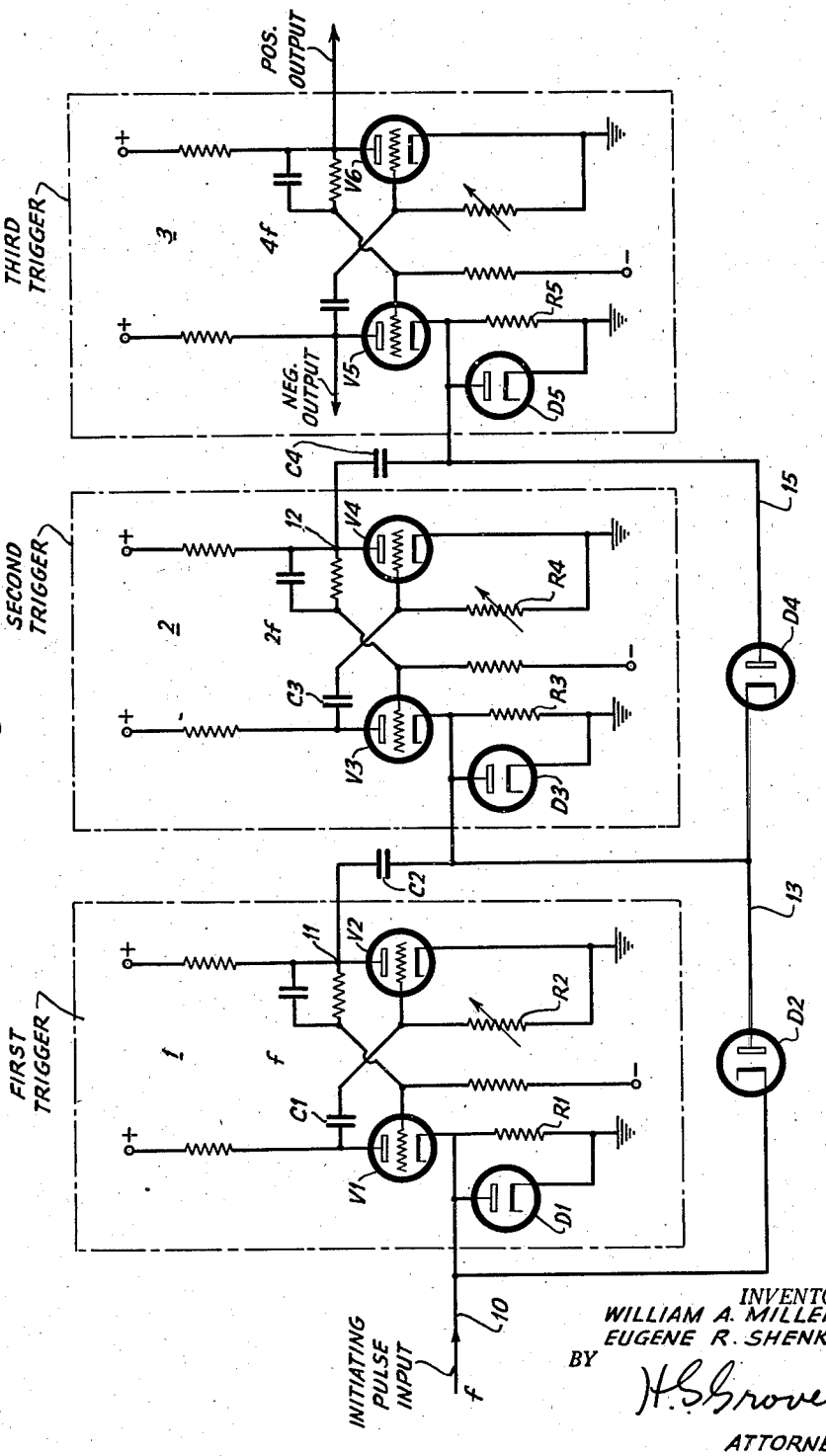

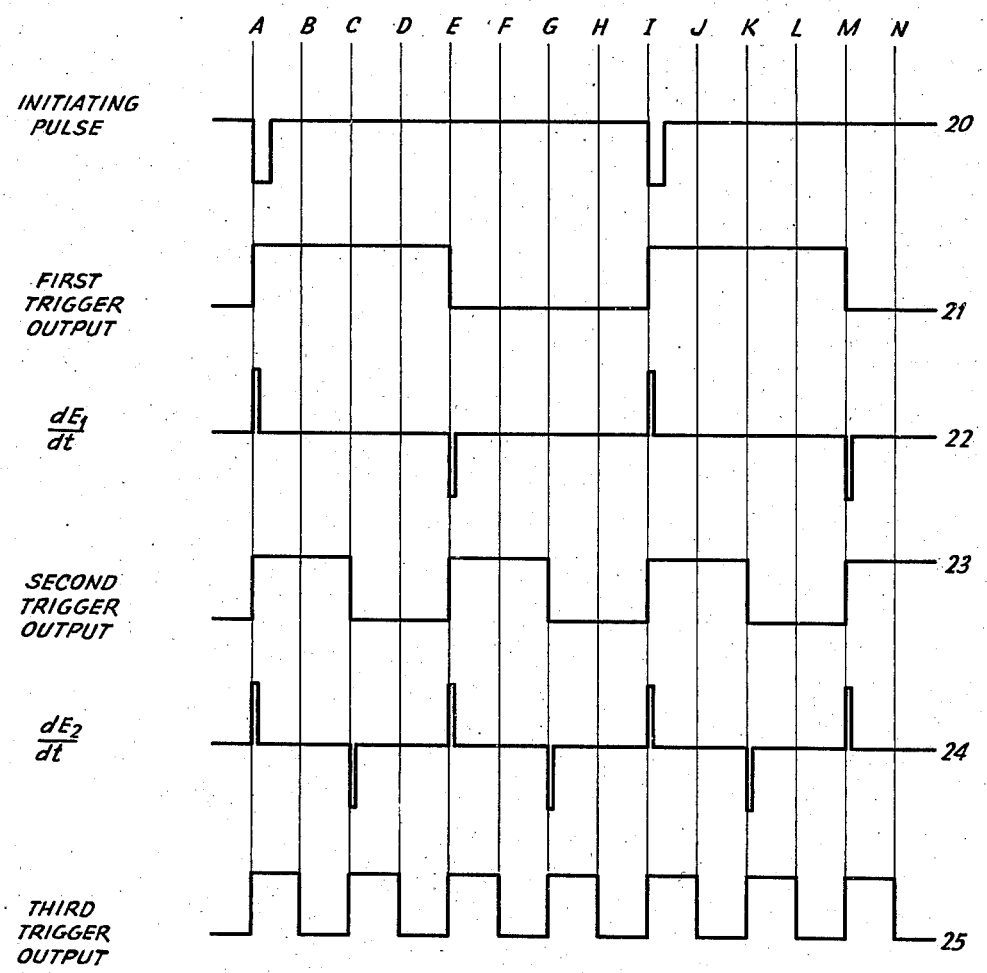

Patented Dec. 11, 1945

2,390,608

UNITED STATES PATENT OFFICE 2,390,608

FREQUENCY MULTIPLIER

William A. Miller, Port Jefferson, and Eugene R. Shenk, Brooklyn, N. Y., assignors to Radio Corporation of America, a corporation of Delaware Application October 5, 1943, Serial No. 505,013

11 Claims. (Cl. 250—36)

This invention relates to frequency multipliers. More specifically, the invention relates to a frequency multiplier circuit employing a plurality of trigger circuits.

In brief, the system of the invention employs a plurality of electronic trigger circuits, each of which includes a pair of electron discharge devices whose grids and anodes are suitably interconnected. The input circuits of all trigger circuits are connected in parallel to receive the same initiating pulse. Means are provided such as diodes, to prevent interaction among the input circuit of the triggers. Further, the trigger circuits are arranged to be of the self-restoring type so as to have different active time periods or, putting it in other words, the outputs from the different triggers have different durations. These trigger circuits are so arranged that the output of the first trigger circuit has the same frequency or repetition rate as the initiating pulse and this output controls a second trigger whose output furnishes pulses of shorter duration than the first trigger. Where a multiplication greater than two is desired, the output of the second trigger is arranged to control the input of a third trigger, and this third trigger is designed to furnish an output pulse whose duration is shorter than the output pulse of the second trigger. This manner of connecting the trigger circuits can be carried out to control a fourth trigger circuit from the third trigger circuit and so forth, the final trigger providing an output pulse of shorter duration than the output pulses of any of the preceding trigger circuits. This final output pulse will have a frequency or repetition rate which follows the relation $2(n-1) \times f$, where $f$ is the frequency of the first trigger circuit and $n$ is the number of trigger circuits employed.

One advantage of the multiplier arrangement of the present invention is that the output wave shapes from the different trigger circuits are of rectangular wave form. Each multiple of the input pulse is a rectangular wave. Thus, this arrangement of the present invention differs considerably from customary frequency multipliers wherein sinusoidal input waves were distorted to provide harmonics which were later filtered to furnish the desired multiple frequency.

A more detailed description of the invention follows in conjunction with the drawings, wherein:

Fig. 2 illustrates another embodiment of the invention for obtaining a multiplication of four; and Fig. 3 is a series of wave forms given to illustrate the principles of operation of the invention.

Figure 1:
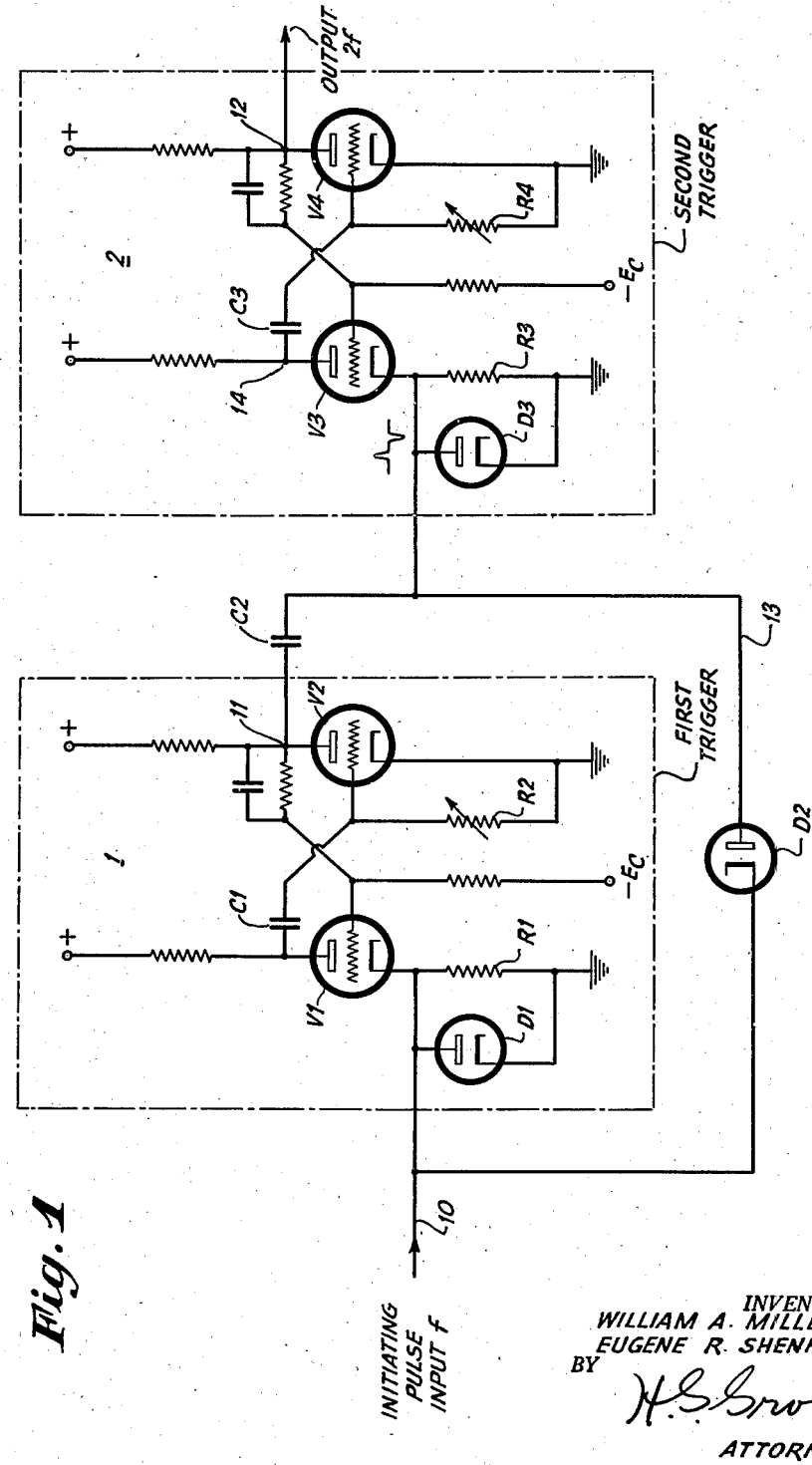
Fig. 1 illustrates a complete embodiment of the present invention for obtaining a frequency multiplication of two.

Referring to Fig. 1 in more detail, there is shown a frequency multiplier arrangement of the invention comprising a pair of trigger circuits 1 and 2 within separate rectangles formed by dot and dash lines, each trigger circuit being composed of a pair of unsymmetrically biased vacuum tubes V1, V2, or V3, V4. The grid and anode electrodes of each trigger circuit are interconnected to provide a regenerative action. The anode of one tube (V1 or V3) in each trigger is connected to the grid of the other tube (V2 or V4) of the same trigger through a condenser C1 or C3, while the anode of the last tube (V2 or V4) is connected to the grid of the first tube (V1 or V3) through a resistor-shunt condenser arrangement. Both trigger circuits are similarly arranged and are of the type described by us in our application Serial No. 492,872, filed June 30, 1943, to which reference is herein made for a more detailed description thereof. Since both trigger circuits are similar, the description of trigger circuit 1 applies equally to trigger 2. Tube V1 is normally non-conducting in the absence of an initiating pulse applied to its cathode, while tube V2 is normally conducting. Tube V1 is normally biased to cut-off by means of source—EC. This condition of operation, wherein tube V1 is normally non-conductive and tube V2 normally conductive is called the stable state. In the active or unstable state, which begins when a negative pulse of sufficient magnitude is applied to lead 10, the current passing conditions of tubes V1 and V2 are reversed from that just described. After an interval in the active state, depending in part upon the time constant of the condenser C1 and the resistor R2, the trigger will restore itself to the stable state. It will thus be seen that the trigger circuit has only one degree of electrical stability. It should be noted that the cathode of tube V1 has in circuit therewith a resistor R1 which is shunted by a diode D1. This resistor may be of relatively high value. The diode D1 is an open circuit for the negative initiating pulse to be applied to lead 10 and which is to be later multiplied in frequency. The use of diode and resistor R1 in the location shown enables the quick dissipation of the negative input pulse which initiates the active period of the trigger circuit and thus obviates any effect the duration of the input pulse might have had on the trigger circuit during its active state.

The trigger, in effect, is a wave reshaper and serves to provide an output negative pulse at point 11 which is of square or rectangular wave form, and which is appreciably longer in duration than the initiating pulse applied to lead 10. The output pulse available at point 11 has a duration which depends upon the time constants of the trigger. It varies from a positive value to a less positive value, so that it is in a negative direction, relatively speaking.

Trigger 2 is similar to trigger 1, and has its vacuum tube V3 normally non-conductive while the vacuum tube V4 is normally conductive. The description given above for trigger 1 applied equally to trigger 2. The time constants of trigger 2, however, are so arranged that the output thereof available at point 12 is composed of pulses whose duration is shorter than the duration of the pulses at point 11 of trigger 1. This is achieved by employing suitable values for condenser C3 and resistor R4 of trigger 2. It should be noted that the output of trigger 1 taken from point 11 is coupled to the input of trigger 2 by means of a condenser C2. Condenser C2, together with resistor R3 of the trigger 2, the latter being in the cathode circuit of vacuum tube V3, forms a differentiating circuit to produce sharp impulses from the starting and trailing edges of the output pulse from the trigger 1. Putting it in other words, the differentiator composed of condenser C2 and resistor R3 utilizes the slopes or steep edges of the output pulses of trigger 1 to produce sharp impulses. It should be noted that it is only the negative impulse applied to the cathode of vacuum tube V3 of the trigger 2 which is effective in tripping trigger 2. The positive impulse produced by the differentiator circuit C2, R3 is not effective in tripping trigger 2.

It should be observed that the inputs of triggers 1 and 2 are connected together in parallel relation through diode D2 and lead 13. This diode serves to prevent interaction between the two triggers.

In the operation of the system of Fig. 1, the initiating pulse of negative polarity and of frequency $f$ applied to lead 10 will trip the two triggers 1 and 2 simultaneously, and cause the two vacuum tubes in each of the triggers to reverse their current passing conditions. Due to the different adjustments and different values of the time constants of both triggers, trigger 2 will restore itself to its stable state before trigger 1 is restored to its stable state. The instant trigger 1 restores itself to its stable state, the output pulse from the trigger 1 will be terminated and there will be produced by the differentiator circuit C2, R3 an impulse of negative polarity to retrip trigger 2. It will thus be seen that trigger 1 operates to produce pulses at the frequency of the initiating pulse $f$ while trigger 2 operates twice as often as trigger 1. More specifically, trigger 2 operates simultaneously with trigger 1 upon the occurrence of an initiating pulse applied to lead 10 and operates again upon the termination of the active time of trigger 1. It is assumed, in this description, that the repetition rate or frequency of the initiating pulse applied to lead 10 is so related to the active times of the triggers 1 and 2 that trigger 2 is restored to its normal stable state after its second operation in the interval between succeeding initiating pulses. Although output pulses from trigger 2 of rectangular or square form, may be taken from point 12, it should be understood that if desired similar output pulses (but of reversed polarity) may be taken from the anode of vacuum tube V3 at point 14. By suitable adjustments of the time constants of the two triggers, the pulses derived therefrom may be square in form, which is 50% mark and 50% space, or have any desired relative percentages of marking and spacing times. The term "mark" has here been employed to denote the weight or duration of the pulse while the term "space" has been employed to denote the interval between pulses. The diode D2 not only serves to couple together the inputs of the two triggers for an initiating pulse, but serves also to prevent negative impulses produced at the cathode of tube V3 from feeding back into the input of trigger 1, which negative impulse might otherwise trip trigger 1. The operation of Fig. 2 is graphically illustrated in Fig. 3 which is described later.

Fig. 2 is an extension of the system of Fig. 1 and illustrates an arrangement employing three trigger circuits 1, 2, 3. It will be noted that the arrangement of the first two triggers is identical with the system of Fig. 1. A third trigger 3 is added to Fig. 2 and coupled by means of lead 15 and diode D4 to the lead 13 and then to the input lead 10 to which the initiating pulse of frequency $f$ is applied. The input of trigger 3 is also coupled to the output of trigger 2 at point 12. Trigger 3 is similar in construction to triggers 1 and 2, except for the values of the time constants thereof, and is also of the type described in our copending application Serial No. 492,872, supra. The time constants of trigger 3 are so arranged that its active time is less than the active time of trigger 2, in turn, also less than the active time of trigger 1. The input of trigger 3 is connected to the output of trigger 2 by means of condenser C4. Condenser C4 and resistor R5 of trigger 3 provide another differentiator circuit for producing sharp impulses from the slopes or edges of the output pulses derived from point 12 on trigger 2. It is only the negative impulse produced by the differentiator C4, R5 which trips trigger 3 and causes the vacuum tubes V5 and V6 to reverse their current passing conditions. It will thus be seen that the inputs of all three triggers are connected in parallel relation with respect to a negative initiating impulse of frequency $f$ applied to lead 10, and that the inputs of the second and third triggers are connected in parallel relation with respect to the negative pulse from the output of trigger 1 available at point 11. Trigger 3, of course, has its input also controlled by means of negative pulses from the output of trigger 2. Thus, trigger 1 produces pulses at the frequency of the initiating pulse $f$, while trigger 2 produces pulses of a frequency $2f$ and trigger 3 produces pulses of a frequency $4f$. It is assumed again, of course, that the repetition rate or frequency of the initiating pulse applied to lead 10 is so related to the active times of triggers 2 and 3 that trigger 2 is restored to its normal stable state after its second operation and trigger 3 restored after its fourth operation in the interval between succeeding initiating pulses. The output pulses from the three triggers are of rectangular or square wave form, of any desired space-to-mark percentage, provided that the relative active times of the three triggers follow the relations mentioned above.

Fig. 3 illustrates, by means of a series of wave forms, the operation of the systems of Figs. 1 and 2. The series of wave forms appear at lines 20, 21, 22, 23, 24, and 25. The abscissa has been divided into equal length time units A, B, C, D ... N. Line 20 illustrates the synchronizing or initiating pulses applied to lead 10 of Figs. 2 and 3. Line 21 illustrates the square or rectangular wave form of the output of trigger 1, which is the first trigger circuit of Figs. 2 and 3. These pulses are available at point 11 on the first trigger circuit. It has been assumed that the pulses occupy a time interval from A to E and from I to M which are equal in time to the space or interval E to I between pulses. The pulses of line 22 occur in point of time at the edges or slopes of the square waves of line 21. The pulses of line 22 are produced by the differentiator circuit in the output of trigger 1. Thus, it will be seen that at times A and I trigger 1 commences its active time in response to an initiating pulse and that simultaneously therewith a sharp impulse is produced in line 22. At times E and M, corresponding to the terminations of the pulses of line 21, additional pulses appear in line 22. Line 23 represents, in the case assumed, square wave output pulses produced by trigger 2. It should be noted that the pulses of line 23 are of one-half the duration of the pulses of line 21; or, putting it in other words, the frequency of the pulses of line 23 corresponding to the output from the second trigger is twice the frequency of the initiating pulses. Lines 20, 21, 22 and 23 thus describe the operation of the system of Fig. 1. Where a third trigger is employed, as in the case of Fig. 2, the pulses from the output of trigger 2 are differentiated to produce sharp impulses of line 24 corresponding to the edges or slopes of the output pulses of trigger 2. Thus pulses appear in line 24, at times A, C, E, G, I, K, and M. Certain ones of these differentiated pulses of line 24 serve to retrip trigger 3 at times corresponding to C, G, and K. It should be noted that it is only the negative impulses of line 24 which retrip the third trigger to cause this trigger to produce output pulses of wave form 25. It should be noted at this time that the initiating pulse of line 20 trips all three triggers simultaneously, as will be seen from an inspection of wave forms 21, 23, and 25. The termination of the output pulse from trigger 1 (note line 21) produces a negative pulse at times E and M (note line 22) which retrips the second and third triggers simultaneously. The termination of the output pulse from trigger 2 at times C, G, and K (note line 23) produces negative pulses at these same times (note line 24) which retrip the third trigger (note line 25). The output from the third trigger, as represented by wave form 25, has a frequency or repetition rate four times that of the initiating pulse. In describing the operation of the systems of Figs. 1 and 2 by means of Fig. 3, it has been assumed that all three triggers operate with 50% mark and 50% space. This assumption it should be understood, is not a limitation on the operation of the invention, since other mark and space ratios are possible, provided care is taken to adjust the circuits for other than a 50% mark. The 50% mark condition assumed above, however, is preferred.

In the event that a multiplication greater than four is desired, it is only necessary to provide additional trigger circuits operating from the output of trigger 3. These trigger circuits should be of the same type as the first three triggers and should be connected in similar manner to those of Fig. 2. The inputs of all triggers should be in parallel relation with respect to the initiating pulses of frequency $f$, there being diodes provided between succeeding triggers to prevent interaction. The time constants of the triggers must, of course, be adjusted to have different active times so that each succeeding trigger has an active time less than that of the preceding trigger, in the manner above described.

The trigger circuits are not limited to vacuum tube structures since, if desired, suitable gaseous type trigger circuits can be employed instead.

What is claimed is:

1. A frequency multiplier comprising first and second triggers, each of which has only one degree of stability and is so constructed and arranged that a pulse of suitable polarity will trip the trigger for a predetermined time interval depending upon its time constants, after which it restores itself to normal, a source of pulses of fundamental frequency connected to the input electrodes of both triggers in parallel, the time constants of said triggers being such that the second trigger restores itself to normal prior to the first trigger and both triggers restore themselves to normal between pulses of fundamental frequency, said pulses having a polarity and magnitude which will trip said triggers simultaneously, and a connection from an output electrode of said first trigger to an input electrode of said second trigger to thereby retrip the second trigger upon the said first trigger being restored to normal but before the occurrence of another pulse of fundamental frequency, and an output circuit connected to said second trigger for deriving pulses whose repetition rate is a multiple of the fundamental pulse frequency.

2. A frequency multiplier comprising first and second triggers, each of which has only one degree of stability and is so constructed and arranged that a pulse of suitable polarity will trip the trigger for a predetermined time interval depending upon its time constants, after which it restores itself to normal, a source of pulses of fundamental frequency connected to the input electrodes of both triggers in parallel, the time constants of said triggers being such that the second trigger restores itself to normal prior to the first trigger and both triggers restore themselves to normal between pulses of fundamental frequency, said pulses having a polarity and magnitude which will trip said triggers simultaneously, and a connection including a differentiator circuit from an output electrode of said first trigger to an input electrode of said second trigger to thereby retrip the second trigger upon the said first trigger being restored to normal but before the occurrence of another pulse of fundamental frequency, and an output circuit connected to said second trigger for deriving pulses whose repetition rate is a multiple of the fundamental pulse frequency.

3. A frequency multiplier comprising first and second triggers, each of which has only one degree of stability and is so constructed and arranged that a pulse of suitable polarity will trip the trigger for a predetermined time interval depending upon its time constants, after which it restores itself to normal, a source of pulses of fundamental frequency connected to the input electrodes of both triggers in parallel, the time constants of said triggers being such that the second trigger restores itself to normal prior to the first trigger and both triggers restore themselves to normal between pulses of fundamental frequency, said pulses having a polarity and magnitude which will trip said triggers simultaneously, a rectifier located between the input electrodes of both triggers to prevent interaction between triggers, and a connection including a differentiator circuit from an output electrode of said first trigger to an input electrode of said second trigger to thereby retrip the second trigger upon the said first trigger being restored to normal but before the occurrence of another pulse of fundamental frequency, and an output circuit connected to said second trigger for deriving pulses whose repetition rate is a multiple of the fundamental pulse frequency.

4. A frequency multiplier comprising first and second trigger circuits each of which has only one degree of stability and includes a pair of vacuum tube electrode structures, one structure of the pair being normally conductive and the other non-conductive in the stable state, and vice versa in the active state, said trigger circuits having means for restoring the aforesaid stable state after a predetermined time interval in the active state, the time constants of said triggers being different such that the second trigger circuit has a shorter active time than the first trigger, a source of pulses of fundamental frequency and of a desired polarity connected to corresponding input electrodes of both trigger circuits for simultaneously tripping said trigger circuits from the stable to the active state, and a connection from an output electrode of said first trigger circuit to said second trigger circuit to cause said second trigger circuit to retrip when the first trigger restores itself to the stable state, said second trigger circuit restoring itself to the stable state after its second operation between pulses of fundamental frequency.

5. A frequency multiplier in accordance with claim 4, characterized in this that said connection includes a differentiator circuit.

6. A frequency multiplier comprising first and second trigger circuits each of which has only one degree of stability and includes a pair of vacuum tube electrode structures, one structure of the pair being normally conductive and the other non-conductive in the stable state, and vice-versa in the active state, said trigger circuits having means for restoring the aforesaid stable state after a predetermined time interval in the active state, the time constants of said triggers being different such that the second trigger circuit has a shorter active time than the first trigger, a source of pulses of fundamental frequency and of a negative polarity connected to correspondingly positioned cathodes of both trigger circuits for simultaneously tripping said trigger circuits from the stable to the active state, and a connection including a differentiator circuit from an output electrode of said first trigger circuit to said second trigger circuit to cause said second trigger circuit to retrip when the first trigger restores itself to the stable state, said second trigger circuit restoring itself to the stable state after the second operation between pulses of fundamental frequency, and a utilization circuit connected to said second trigger for deriving pulses whose repetition rate is a multiple of the fundamental pulse frequency.

7. A frequency multiplier comprising first and second trigger circuits each of which has only one degree of stability and includes a pair of vacuum tube electrode structures, one structure of the pair being normally conductive and the other non-conductive in the stable state, and vice versa in the active state, said trigger circuits having means for restoring the aforesaid stable state after a predetermined time interval in the active state, the time constants of said triggers being different such that the second trigger circuit has a shorter active time than the first trigger, a source of pulses of fundamental frequency and of a negative polarity connected to correspondingly positioned cathodes of both trigger circuits for simultaneously tripping said trigger circuits from the stable to the unstable state, a diode connected between said cathodes and so arranged as to prevent interaction between said trigger circuits, and a connection including a differentiator circuit from an output electrode of said first trigger circuit to said second trigger circuit to cause said second trigger circuit to retrip when the first trigger restores itself to the stable state, said second trigger circuit restoring itself to the stable state after its second operation between pulses of fundamental frequency, and a utilization circuit connected to said second trigger for deriving pulses whose repetition rate is a multiple of the fundamental pulse frequency.

8. A frequency multiplier in accordance with claim 4, including means connected between said input electrodes for preventing interaction between said trigger circuits, and including a differentiator circuit in the connection from the output electrode of said first trigger circuit to said second trigger circuit.

9. A frequency multiplier comprising first, second and third trigger circuits each of which includes a pair of electric tube electrode structures, one structure of the pair being normally conductive and the other non-conductive in the stable state, and vice versa in the active state, said trigger circuits having means for restoring the aforesaid stable state after a predetermined time interval in the active state, the time constants of said triggers being different and progressively shorter such that said second trigger circuit has a shorter active time than the first trigger circuit and the third trigger circuit, in turn, has a shorter active time than the second trigger circuit, a source of pulses of fundamental frequency and of a desired polarity connected to corresponding input electrodes of all three trigger circuits for simultaneously tripping said trigger circuits from the stable state to the active state, means between said input electrodes for preventing interaction between said trigger circuits, a connection from the output of said first trigger circuit to said second trigger circuit to cause said second trigger circuit to retrip when said first trigger restores itself to the stable state, and a connection from the output of said second trigger circuit to said third trigger circuit to cause said third trigger circuit to retrip when said second trigger circuit restores itself to the stable state, said third trigger circuit restoring itself to the stable state between pulses of fundamental frequency.

10. A frequency multiplier comprising first and second triggers, each of which is so constructed and arranged that a pulse of suitable polarity will trip the trigger for a predetermined time interval depending upon its time constants, after which it restores itself to normal, a source of pulses of fundamental frequency connected to the input electrodes of both triggers in parallel, the time constants of said triggers being such that the second trigger restores itself to normal prior to the first trigger and both triggers restore themselves to normal between pulses of fundamental frequency, said pulses having a polarity and magnitude which will trip said first trigger, a connection from said source to said second trigger to cause said second trigger to trip simultaneously with said first trigger, and a connection from an output electrode of said first trigger to an input electrode of said second trigger to thereby retrip the second trigger upon the said first trigger being restored to normal but before the occurrence of another pulse of fundamental frequency, and an output circuit connected to said second trigger for deriving pulses whose repetition rate is a multiple of the fundamental pulse frequency.

11. A frequency multiplier comprising first and second trigger circuits each of which includes a pair of electric tube electrode structures, one structure of the pair being normally conductive and the other non-conductive in the stable state, and vice versa in the active state, said trigger circuits having means for restoring the aforesaid stable state after a predetermined time interval in the active state, the time constants of said triggers being different such that the second trigger circuit has a shorter active time than the first trigger, a source of pulses of fundamental frequency and of a desired polarity connected to the input electrode of said first trigger for tripping the same, a connection from said source to said second trigger to cause said second trigger to trip simultaneously with said first trigger, and a connection including a differentiator circuit from an output electrode of said first trigger circuit to said second trigger circuit to cause said second trigger circuit to retrip when the first trigger restores itself to the stable state, said second trigger circuit restoring itself to the stable state after its second operation between pulses of fundamental frequency.

WILLIAM A. MILLER.
EUGENE R. SHENK.